United States Patent [19]
Relles et al.

[11] 3,821,164
[45] June 28, 1974

[54] FILM FORMING CHLORINATED POLYIMIDE-ETHERS AND METHOD FOR MAKING SAME

[75] Inventors: Howard M. Relles, Rexford; Robert W. Schluenz, Latham, both of N.Y.

[73] Assignee: General Electric Company, Schenectady, N.Y.

[22] Filed: Feb. 16, 1972

[21] Appl. No.: 226,978

[52] U.S. Cl... 260/47 CZ, 117/161 P, 117/161 UN, 260/32.6 N, 260/33.8 R, 260/47 UA, 260/49, 260/78 UA, 260/DIG. 24
[51] Int. Cl............................................. C08g 20/32
[58] Field of Search...... 260/47 CZ, 78 UA, 47 UA, 260/49

[56] References Cited
UNITED STATES PATENTS

| | | | |
|---|---|---|---|
| 3,533,996 | 10/1970 | Grundschober et al. | 260/47 |
| 3,642,712 | 2/1972 | Sambeth et al. | 260/78 |
| 3,651,012 | 3/1972 | Holub et al. | 260/47 |
| 3,652,715 | 3/1972 | Holub et al. | 260/860 |
| 3,652,716 | 3/1972 | Holub et al. | 260/860 |

Primary Examiner—Lester L. Lee
Attorney, Agent, or Firm—William A. Teoli; Joseph T. Cohen; Jerome C. Squillaro

[57] ABSTRACT

Film forming flame resistant chlorinated polyimide ethers are provided, and a method for making them. Reaction can be effected between a dihydric phenol and dichloromaleimide or tetrachlorobismaleimide in the presence of base. Self-condensation of dichloroimidophenols also provide valuable flame resistant polymers.

29 Claims, No Drawings

FILM FORMING CHLORINATED POLYIMIDE-ETHERS AND METHOD FOR MAKING SAME

The present invention relates to chlorinated polyimide-ethers and a method for making such materials. More particularly the present invention relates to the base catalyzed intermolecular condensation of chloroimides with phenols.

The film forming chlorinated polyimide-ethers of the present invention are polymers consisting essentially of chemically combined units selected from, (1) 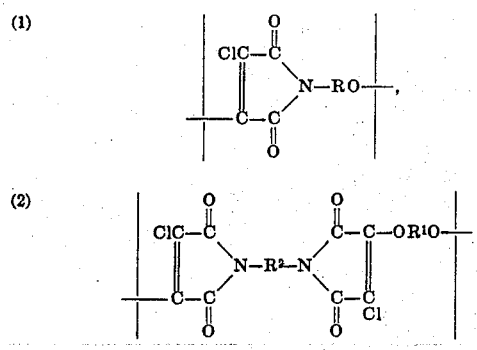

(2)

and mixtures thereof,
where R and $R^1$ are selected from arylene hydrocarbon radicals, and diorgano radicals of the formula, (3) 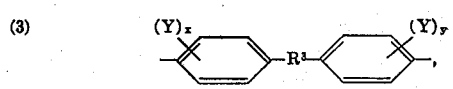

$R^2$ is selected from divalent hydrocarbon radicals and diogano radicals of formula (3), $R^2$ is selected from $C_{(1-8)}$ alkylene.

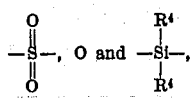

$R^4$ is selected from monovalent hydrocarbon radicals, Y is selected from lower alkyl and halogen, and $x$ and $y$ are whole numbers equal to from 0 to 3 inclusive.

Radicals included by R and $R^1$ of formula (1) are for example, phenylene, tolylene, xylylene, napthylene, anthrylene, etc., and diorgano radicals, such

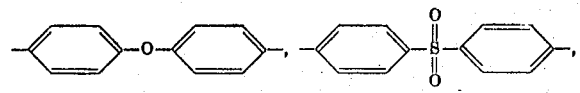

etc. Radicals included by $R^2$ of formula (2) are for example, $C_{(1-8)}$ alkylene radicals, such as methylene, dimethylene, trimethylene, etc., and R and $R^1$ radicals as previously defined. Radicals included by $R^3$ are for example, alkylene radicals, such as methylene, dimethylene, trimethylene, tertramethylene, methylidene, propylidene, etc.,

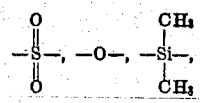

etc.

There is also provided by the present invention, a method for making chlorinated polyimide ethers of formula (2), which comprises, 1. effecting reaction between substantially equal molar amounts of a chlorinated bismaleimide of the formula,

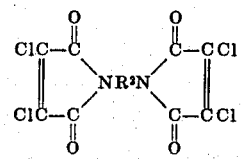

and a dihydric phenol of

$$HOR^1OH \qquad (5)$$

in the presence of a base, 2. recovering the clorinated polyimide-ethers from the resulting mixture of (1), where $R^1$ and $R^2$ are as previously defined.

In addition to the above described method of making the chlorinated polyimide-ether of the present invention, there is also provided a method for making chlorinated imideethers of formula (1) involving the self-condensation of chloroimidopheonols of the formula,

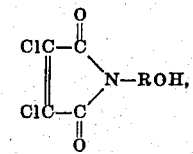

which comprises (1) effecting the self-condensation of a chloroimidophenol of formula (6) in the presence of base, (2) recovering a chlorinated polyimide ether from the resulting mixture of (1), where R is as previously defined.

Included by the dihydric phenol of formula (5) there are for example, Bispheonol-A, resorcinol, hydroquinone, ortho-dihydroxybenzene, dihydroxydiphenylsulfone, 4,4'-dihydroxy-3,3', 5,5'-tetramethylbiphenyl, tetrabromo-bisphenol-A, chlorohydroquinone, etc.

Chlorinated bisimides included by formula 4, and a method for making them are described in my copending application Ser. No. 226,974, filed Feb. 16, 1972, filed concurrently herewith. As taught in Ser. No. 226,974, α-carbon hydrogen atoms on maleic anhydride and maleimides derived therefrom, can be readily replaced with chlorine atoms without undesirable side reactions to produce the corresponding polychloro aliphatically unsaturated compounds in high yields. Reaction between maleic anhydride or maleimide derived therefrom can be effected with thionyl chloride in the presence of pyridine. The order of addition of the various reactants in forming the reaction mixture is not critical. Experience has shown that optimum results are achieved, if the aliphatically unsaturated reactant, which can be, for example, the bismaleimides such as N,N'-p,p'-diphenylmethane-bis-maleimide or any other bismaleimide falling within the scope of formula 4, where hydrogen atoms would be shown in place of chlorine atoms is dissolved in the thionyl chloride and the pyridine is added to the resulting solution. Thionyl chloride also can be used in less than solvent amounts, provided quantities are employed which are at least sufficient to replace α-carbon hydrogen atoms of the aliphatically unsaturated reactant with chlorine atoms. If desired, excess unreacted thionyl chloride can be recovered by stripping the mixture under reduced pressure. Pyridine is employed in amounts of at least 2 moles of pyridine, per mole of aliphatic unsaturated reactant. The pyridine is recovered as pyridine hydrochloride and can be reused after neutralization and drying.

Reaction can be achieved at ambient conditions if desired, or the reactants can be refluxed to facilitate the formation of the desired polychlorinated maleic anhydride or maleimide reaction product. Reaction times of as little as 5 mnutes or less to 1 hour or more will not be unusual, depending upon such factors as degree of agitation, the ingredients employed, conditions used, proportions of the reactants, etc. There are included for example, bis-dichloromaleimides of methylenedianiline, toluenediamine, phenylenediamine, ethylenediamine, diamonodiphenylsulfone, diaminodiphenyl ether, etc.

Imide phenols included by formula 6, are for example, N-4-hydroxyphenyl-dichloromaleimide, N-3-hydroxyphenyl-dichloromaleimide, etc. The chlorinated polyimide-ethers of formula (2), can be made by effecting contact between the chlorinated bismaleimide and the dihydric phenol in the presence of a base catalyst, and suitable organic solvent. Depending upon the nature of the reactants, ambient temperatures or heating of the reaction mixture, such as to reflux along with agitation, can be required to facilitate the production of polymer. Recovery of the chlorinated polyimide-ether can be obtained by effecting the precipitation of polymer from an acidic aqueous medium, such as a methanolic aqueous medium.

Suitable organic solvents which can be employed are any organic solvent inert to the reactants during reaction and which the reactants are soluble and which allows for the build up of molecular weight of the resulting polymer to an intrinsic viscosity of between 0.10 to 1.00. Included by such organic solvents are for example, dimethylsulfoxide, dimethylformamide, methylene chloride, dimethylacetamide, N-methylpyrrolidone, etc. Bases which can be employed in the reaction mixture to form the chlorinated polyimide ethers are for example, alkaline earth oxides, such as calcium oxide, magnesium oxide, barium oxide, etc.; as well as alkaline earth hydroxides; alkali metal carbonates, such as potassium carbonate, sodium, lithium, etc. In addition, there also can be employed organic amines, such as triethyl amine, dicyclohexylmethyl amine, 1,2,2,6,6-pentamethylpiperidine, pyridine, etc. Temperatures in the range of from 25°C to 65°C can be employed during the polymerization. Reaction times of between 30 minutes or less to several hours or more are not unusual depending upon the nature of the reactants and such factors as degree of agitation, catalyst, solvent, etc.

Generally, the self-condensation of the chloroimide phenols of formula 6, can be readily effected using the conditions such as temperature, solvent, catalyst, which are employed for the intercondensation reaction described above for the chlorinated bismaleimide and the dihydric phenol.

After the polymerization has proceeded to a desired degree, which can be determined by removal of a titer of the reaction mixture, to determine its intrinsic viscosity of the polymer in chloroform at 25°C, the reaction mixture can be poured into an aqueous acidic medium containing such solvents as methanol, tetrahydrofuran, etc. to effect the precipitation of the polymer. Recovery of polymer can be achieved by standard means, such as by filtration, decanting, centrifuging, etc. Films can be cast from solutions of polymer in dimethylformamide and chloroform. The resulting films can be employed as flame resistant insulating coatings on various substrates. The flame resistance test employed to determine the self-extinguishing characteristics of the film forming chlorinated polyimide-ethers of the present invention was as follows:

A 1/16 inch × ¼ inch × 6 inch sample was placed three-eighths inch above a ¾ inch bnsen burner flame for 10 seconds. The sample was then pulled out of the flame to determine whether it ignited and for what period of time. If it burned 25 seconds or less, it was considered self-extinguishing. An average of 3 film samples were employed in each test to determine the self-extinguishing characteristics of the film.

It has been found that the thermoplastic film which is cast can be rendered thermoset or insoluble in organic solvents by heating it to temperatures in the range of from 200°C to 300°C over a period of several minutes. Films made in accordance with the practice of the present invention from the chlorinated polyimide-ethers can have tensile strength in the range of from 8,000 psi to 13,000 psi, while exhibiting elongations in the range of from between 4 to 94 percent, on an Instron Tester at 25°C.

In order that those skilled in the art will be better able to practice the present invention, the following examples are given by way of illustration and not by way of limitation.

EXAMPLE 1

A mixture was stirred at 65°C for 6½ hours consisting of 0.01 mole of the bis-dichloromaleimide of methylene-dianiline, 0.01 mole of Bisphenol-A, 0.1 mole of calcium oxide in 50 ml of dimethyl formamide. There was then added to the resulting mixture, 50 ml of dimethyl formamide to reduce the viscosity. The resulting mixture was then filtered through celite. A crude product was obtained by pouring the mixture into aqueous acidic methanol and drying the resulting precipitate in vacuum at 90°C. A product was obtained at a yield by weight of 97 percent having an intrinsic viscosity in dimethylformamide of 0.54 at 25°C and a Tg of 173°C. Based on the method of preparation, its N.M.R., I.R., spectra, and elemental analysis, the product was a polymer consisting essentially of chemically combined units of the formula,

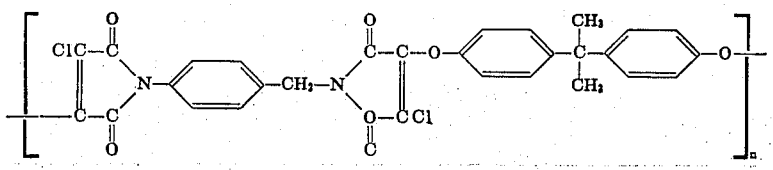

where $n$ is an integer which can have a value of from 10 to 500 inclusive.

A flexible film of the above polymer was cast from chloroform. It had a tensile strength of 8830 psi and a yield strength of 9110 psi and an elongation of 94 percent. The film was found to be self-extinguishing when tested in the previously described flame test.

Following the same procedure, with the exception of using 0.002 mole of dicyclohexylmethyl amine in combination with the calcium oxide in the mixture and stirring the mixture at 45°C for 11 hours, there was obtained a polymer having an intrinsic of 0.55 in chloroform at 25°C. When the calcium oxide was replaced with potassium carbonate in the above mixture, there was obtained after 7 hours at 25° a polymer having an intrinsic viscosity of 0.47 in chloroform at 25°C and a yield of 81 percent.

A 61 percent yield of polymer having an intrinsic of 0.33 in chloroform at 25°C was obtained after 1½ hours of reaction at 25° when dimethylsulfoxide was substituted for dimethylformamide and 0.0004 mole of triethylamine was added to the potassium carbonate used as base.

Both of the above polymers were cast to form valuable flame resistant films following the above described procedure.

EXAMPLE 2

A mixture of 0.01 mole of the bis-dichloromaleimide of Example 1, 0.01 mole of hydroquinone, 0.1 mole of calcium oxide, and 0.0005 mole of triethylamide was stirred in 50 ml of dimethylformamide for 5½ hours at 25°C under a nitrogen atmosphere. Following the procedure for recovering polymer in Example 1, there was obtained an 80 percent of polymer having an intrinsic viscosity of 1.01 in dimethylformamide and a Tg of 192°C. Based on the method of preparation, its I.R. spectrum, and elemental analysis, the polymer consisted essentially of chemically combined units of the formula,

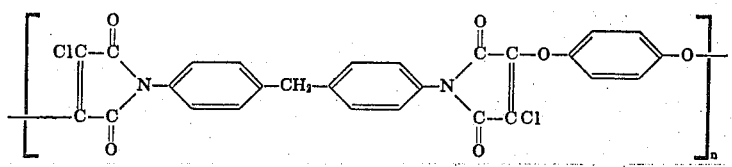

where $n$ is an integer which can have a value of from 10 to 500 inclusive.

A film of the above polymer was cast from dimethylformamide. It had a tensile strength of 11400 ± 700 psi, and an elongation of 5 percent.

A similar procedure was repeated as described above, except that potassium carbonate was utilized in place of the calcium oxide, and there was employed 0.004 mole of triethylamine. After 7 hours of stirring at 25°C, there was obtained after precipitation from the methanolic acidic media, an 86 percent yield of polymer having an intrinsic viscosity of 0.65 when measured in cresol at 25°C.

EXAMPLE 3

A solution of 0.01 mole of the bis-dichloromaleimide of oxydianiline and 0.01 mole of 4,4'-dihydroxy-2,2', 6,6'-tetrabromo-3,3', 5-5'-tetramethylbiphenyl was stirred in 50 ml of dimethyl formamide at 25°C. There was then added 0.1 mole of calcium oxide to the mixture while it was stirring. After 35 minutes. The mixture was too viscous to be stirred and an additional 200 ml of dimethylformamide was added while it was stirred vigorously. There was obtained a 92 percent yield of product in accordance with the recovery work up procedure as previously described, which had an intrinsic viscosity of 0.75 in dimethylformamide in 25°C. Based on the method of preparation, its I.R. spectrum, and elemental analysis, the product was a chlorinated polyimide-ether consisting essentially of chemically combined units of the formula,

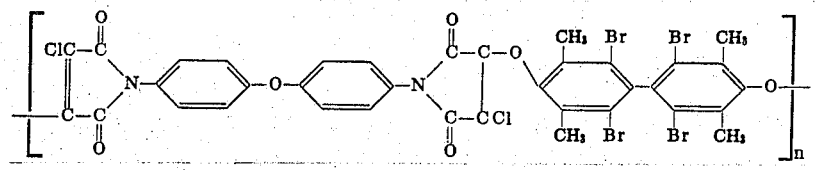

where $n$ is an integer which can have a value of from 10 to 500 inclusive.

A film was cast from a dimethylformamide solution of the above polymer. It exhibited valuable insulating and flame resistant properties based on the previously described test procedure.

EXAMPLE 4

Several chlorinated polyimide-ether polymers were prepared by effecting reaction between 0.01 mole chlorinated bismaleimide of Example 1, and 0.01 mole of various bisphenols utilizing 50 ml of dimethylformamide in the respective mixtures. The polymers were prepared at 25°C employing various reaction times. The following table shows the bisphenols utilized to form the respective chlorinated polyimide-ethers and the base catalyst employed in the respective mixtures, as well as the reaction time and the yield of polymer.

TABLE I

| BISPHENOL | BASE(moles) | REACTION TIME(hrs.) | YIELD OF POLYMER(%) |
|---|---|---|---|
| Catechol | CaO (0.1) | 26 | — |
| Bisphenol of Example 3 | Et$_3$N (0.00005) K$_2$CO$_3$ (0.1) | 2 | 90 |
| Tetrabromo-bis-phenol-A | K$_2$CO$_3$ (0.1) Et$_3$N (0.0004) | ¾ | 85 |
| Tetrachloro-bisphenol-A | K$_2$CO$_3$ (0.1) Et$_3$N (0.0004) | 5/6 | 84 |
| Tetramethyl-bisphenol-A | K$_2$CO$_3$ (0.1) Et$_3$N (0.0004) | 20 | 81 |
| Chlorohydro-quinone | CaO (0.1) Et$_3$N (0.00005) | 3 ½ | 70 |

All of the above polymers were recovered in accordance with the procedure of Example 1. Films were cast from dimethylformamide solution to produce flame resistant high strength films, exhibiting valuable insulating properties.

EXAMPLE 5

An additional variety of chlorinated polyimideethers were made employing the bis-dichloromaleimide of m-phenylenediamine as the chlorinated bismaleimide, which was reacted with a variety of bisphenols employing 0.01 mole each of polymer reactants respectively, and utilizing 50 ml of dimethylformamide solvent and a temperature of 25°C. the following shows the bisphenols employed, as well as the base and moles, reaction time and the yield of the respective polymers:

TABLE II

| BISPHENOL | BASE(moles) | REACTION TIME(hrs.) | YIELD OF POLYMER(%) |
|---|---|---|---|
| Bisphenol-A | CaO (0.1) Et$_3$N (0.00005) | 3 ½ | 89 |
| Hydroquinone | CaO (0.1) Et$_2$N (0.00005) | 6 | 89 |
| Bisphenol of Example 3 | CaO (0.1) | 5/12 | — |
| Tetrachlorobisphenol-A | CaO (0.1) | 4 | 95 |
| Chlorohydroquinone | K$_2$CO$_3$ (0.1) Et$_3$N (0.0004) | 4 | — |

The above chlorinated polyimide-ethers were cast from dimethylformamide solvent to produce high strength flame resistant films exhibiting valuable insulating characteristics.

EXAMPLE 6

A further variety of chlorinated polyimide-ethers were prepared by effecting reaction between 0.01 mole of the bis-dichloromaleimide of p-phenylenediamine with an equal molar amount of various bisphenols utilizing 50 ml of dimethylformamide at a temperature of 25°C. The following shows the base and moles utilized in the reaction as well as the reaction time and yield of polymer:

TABLE III

| BISPHENOL | BASE(moles) | REACTION TIME(hrs.) | YIELD OF POLYMER(%) |
|---|---|---|---|
| Bisphenol-A | K$_2$CO$_3$ (0.1) Et$_3$N (0.0004) | 1 ⅔ | 77 |
| Tetrachlorobisphenol-A | CaO (0.1) Et$_3$N (0.00005) | 22 | 72 |

Films were cast from dimethylformamide solutions of each of the above polymers. All were found to be self-extinguishing.

EXAMPLE 7

A number of chlorinated polyimide-ethers were prepared utilizing 0.01 mole of Bisphenol-A with an equal molar amount of various bis-dichloromaleimides in 50 ml of dimethylformamide and employing a temperature of 25°C, with stirring. The chlorinated bisimides employed, the base in moles and reaction time, and yield of respective chlorinated polyimide-ethers are shown as follows.

TABLE IV

| BIS-DICHLOROMALEIMIDE OF | BASE(moles) | REACTION TIME(hrs.) | YIELD OF Polymer (%) |
|---|---|---|---|
| Diaminodiphenyl | CaO (0.1) | 4.50 | 98 |
| sulfone | Et$_3$N (0.00005) | | |
| -2,4-toluene-diamine | CaO (0.1) Et$_3$N (0.00005) | 3 | 87 |
| -Oxydianiline | CaO (0.1) Et$_3$N (0.00005) | 32.5 | 94 |

The above chlorinated polyimide-ethers were recovered in accordance with the above described procedure and cast from dimethylformamide. There were obtained flame resistant tough films exhibiting valuable insulating characteristics.

EXAMPLE 8

A reaction was effected between equal molar amounts of the bis-dichloromaleimide of ethylene diamine and the bisphenol of Example 3 in the presence of calcium oxide and utilizing a dimethyl formamide as a solvent. Reaction was effected at 25°C in about 4½ hours, during which time the mixture was stirred constantly. There was obtained a 90 percent yield of polymer having an intrinsic viscosity of 0.12 in dimethylformamide at 25°C following the previously described procedure for recovery.

Based on the method of preparation, its I. R. spectrum, and elemental analysis, the polymer consisted essentially of chemically combined units of the formula,

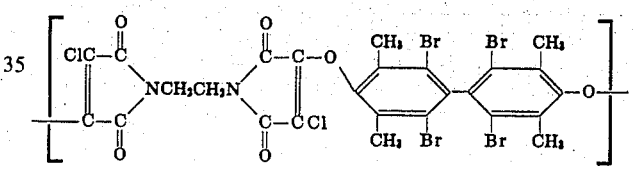

EXAMPLE 9

Reaction was effected between 0.01 mole of the bis-dichloromaleimide of 1,3-propylenediamine and 0.01 mole of various dihydric phenols in the presence of a base catalyst and dimethylformamide. The reaction was conducted at 25°C during which time the mixture was constantly stirred. The following shows the dihydric phenols employed and the base utilized, as well as the yield of polymer obtained in both instances:

| DIHYDRIC PHENOL | BASE | YIELD OF POLYMER |
|---|---|---|
| Bisphenol-A | CaO triethylamine | 87 |
| Bisphenol of Example 3 | CaO | 95 |

EXAMPLE 10

A sample of 0.01 mole of N-(3-hydroxyphenyl)-dichloromaleimide was stirred for a period of 5 hours at 25°C in 25 ml of dimethylformamide with a mixture of 0.05 mole of potassium carbonate and 0.0002 mole of triethylamine. A product was recovered by precipitation in acidic methanolic media and at a yield of about 70 percent. Based on the method of preparation and infrared spectrum, it was a polymer having an intrinsic viscosity of 0.25 in dimethylformamide and consisting essentially of chemically combined units of the formula,

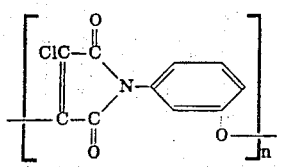

where n is an integer having a value of from 10 to 500 inclusive.

Although the above examples include several of the very many chlorinated polyimide-ethers which can be made by the method of the present invention, it should be understood that the present invention is directed to a much broader class of polymers as shown by formula (1) and (2).

What I claim as new and desire to secure by Letters Patent of the United States is:

1. A film forming chlorinated polyimide-ether consisting essentially of chemically combined units of the formula,

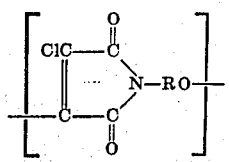

were R is selected from arylene hydrocarbon radicals and diorgano radicals of the formula,

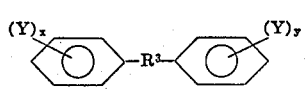

$R^3$ is selected from $C_{(1-8)}$ alkylene and

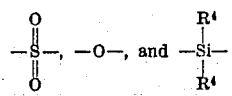

$R^4$ is selected from monovalent hydrocarbon radicals, Y is selected from lower alkyl and halogen, and x and y are whole numbers equal to from 0 to 3 inclusive.

2. A chlorinated polyimide-ether consisting essentially of chemically combined units of the formula

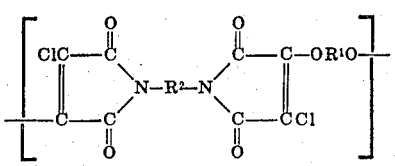

where $R^1$ is selected from arylene hydrocarbon radicals, and diorgano radicals of the formula

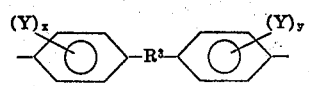

and $R^2$ is selected from divalent hydrocarbon radicals and said diorgano radicals, $R^3$ is selected from $C_{(1-8)}$ alkylene,

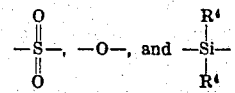

$R^4$ is selected from monovalent hydrocarbon radicals, Y is selected from lower alkyl and halogen, and x and y are whole number equal to from 0 to 3 inclusive.

3. A method for making a chlorinated polyimide-ether which comprises, (1) effecting the self-condensation at a temperature in the range of from 25°C – 65°C of a dichloromaleimido-phenol of the formula,

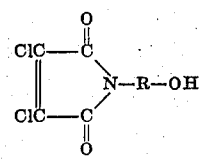

in the presence of base, selected from the class consisting of alkaline earth oxides, alkaline earth carbonates, alkaline earth hydroxides, and organic amines, and (2) pouring the resulting reaction mixture into an aqueous acidic medium and (3) recovering a chlorinated polyimide-ether from the mixture of (1), where R is selected from arylene hydrocarbon radicals, and diorgano radicals of the formula,

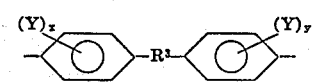

$R^3$ is selected from $C_{(1-8)}$ alkylene,

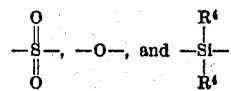

$R^4$ is selected from monovalent hydrocarbon radicals, Y is selected from lower alkyl and halogen, and x and y are whole numbers equal to from 0 to 3 inclusive.

4. A chlorinated polyimide-ether in accordance with claim 1, where R is

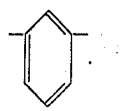

5. A chlorinated polyimide-ether in accordance with claim 1, where R is

6. A chlorinated polyimide-ether in accordance with claim 2, where R² is

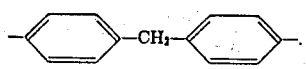

7. A chlorinated polyimide-ether in accordance with claim 6, where R¹ is

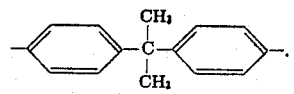

8. A chlorinated polyimide-ether in accordance with claim 6, where R¹ is

9. A chlorinated polyimide-ether in accordance with claim 6, where R¹ is

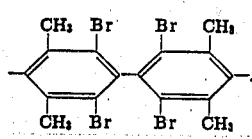

10. A chlorinated polyimide-ether in accordance with claim 6, where R¹ is

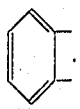

11. A chlorinated polyimide-ether in accordance with claim 6, where R¹ is

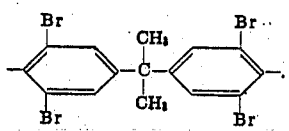

12. A chlorinated polyimide-ether in accordance with claim 6, where R¹ is

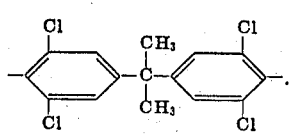

13. A chlorinated polyimide-ether in accordance with claim 6, where R¹ is

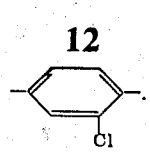

14. A chlorinated polyimide-ether in accordance with claim 6, where R¹ is

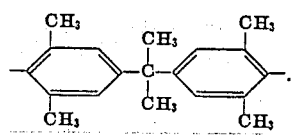

15. A chlorinated polyimide-ether in accordance with claim 2, where R² is

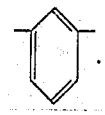

16. A chlorinated polyimide-ether in accordance with claim 15, where R¹ is

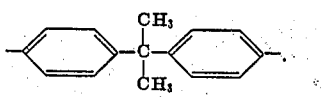

17. A chlorinated polyimide-ether in accordance with claim 15, where R¹ is

18. A chlorinated polyimide-ether in accordance with claim 15, where R¹ is

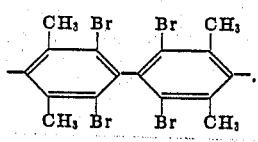

19. A chlorinated polyimide-ether in accordance with claim 15, where R¹ is

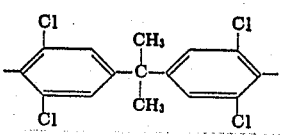

20. A chlorinated polyimide-ether in accordance with claim 15, where R¹ is

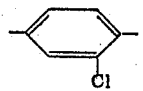

21. A chlorinated polyimide-ether in accordance with claim 2, where $R^1$ is

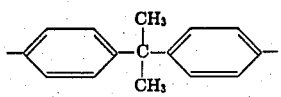

22. A chlorinated polyimide-ether in accordance with claim 21, where $R^2$ is

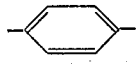

23. A chlorinated polyimide-ether in accordance with claim 21, where $R^2$ is

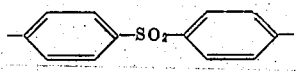

24. A chlorinated polyimide-ether in accordance with claim 21, where $R^2$ is

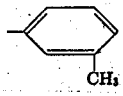

25. A chlorinated polyimide-ether in accordance with claim 2, where $R^1$ is

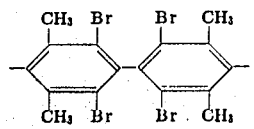

26. A chlorinated polyimide-ether in accordance with claim 25, where $R^2$ is

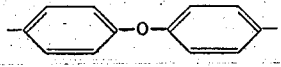

27. A chlorinated polyimide-ether in accordace with claim 25, where $R^2$ is $-CH_2CH_2-$.

28. A chlorinated polyimide-ether in accordance with claim 25, where $R^2$ is $-CH_2CH_2CH_2-$.

29. A method for making a chlorinated polyimide-ether which comprises, (1) effecting reaction at a temperature between about 25°C – 65°C between equal molar amounts of a bis-dichloromaleimide of the formula,

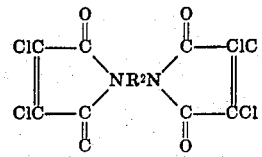

and a dihydric phenol of the formula,

[HOR'OH] HOR¹OH in the presence of base, selected from the class consisting of alkaline earth oxides, alkaline earth hydroxides, alkaline earth carbonates and organic amines, and (2) pouring the resulting reaction mixture into an aqueous acidic medium and (3) recovering a chlorinated polyimide-ether from the resulting mixture of (1) where $R^1$ is selected from arylene hydrocarbon radicals, and diorgano radicals of the formula,

$R^2$ is selected from divalent hydrocarbon radicals and said diorgano radicals, $R^3$ is selected from $C_{(1-8)}$ alkylene,

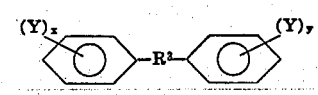

$R^4$ is selected from monovalent hydrocarbon radicals, Y is selected from lower alkyl and halogen, and $x$ and $y$ are whole numbers equal to from 0 to 3 inclusive.

* * * * *